(No Model.) 2 Sheets—Sheet 1.

A. F. TIEDE & J. WILCOX.
CHECK ROW PLANTER.

No. 361,558. Patented Apr. 19, 1887.

WITNESSES:
Otto Beyer
C. Sedgwick

INVENTOR:
A. F. Tiede
J. Wilcox
BY
Munn & Co
ATTORNEYS.

(No Model.) 2 Sheets—Sheet 2.
A. F. TIEDE & J. WILCOX.
CHECK ROW PLANTER.
No. 361,558. Patented Apr. 19, 1887.
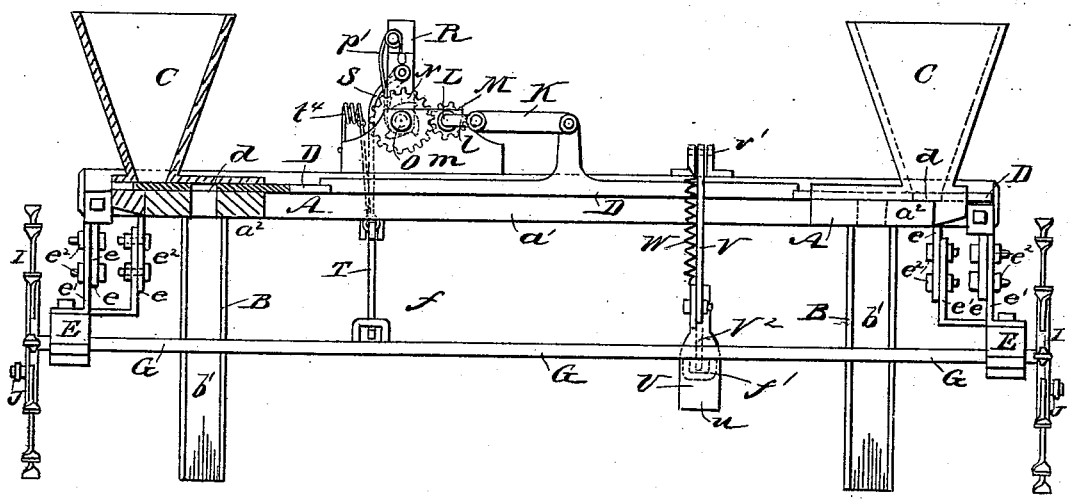
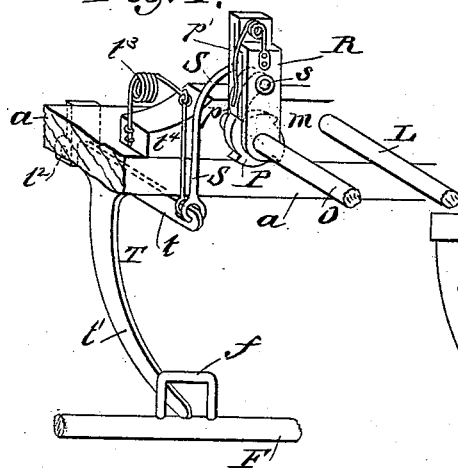
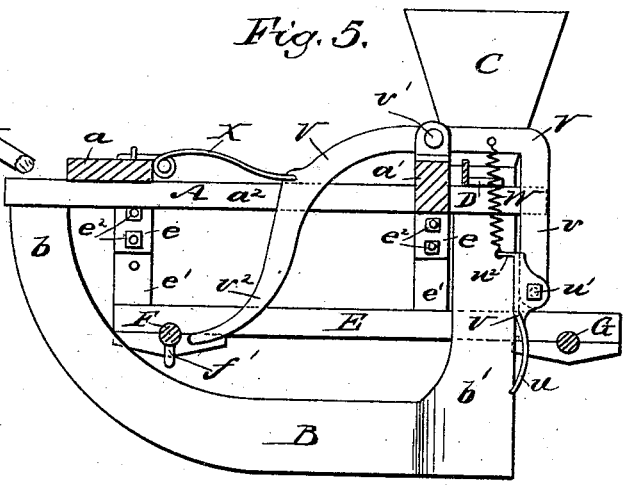
WITNESSES:
INVENTOR:
A. F. Tiede
J. Wilcox
BY Munn & Co
ATTORNEYS.

UNITED STATES PATENT OFFICE.

AUGUST F. TIEDE AND JAIRUS WILCOX, OF PRESTON, IOWA; SAID WILCOX ASSIGNOR TO DANA E. WILCOX, OF SAME PLACE.

CHECK-ROW PLANTER.

SPECIFICATION forming part of Letters Patent No. 361,558, dated April 19, 1887.

Application filed January 18, 1887. Serial No. 224,688. (No model.)

*To all whom it may concern:*

Be it known that we, AUGUST F. TIEDE and JAIRUS WILCOX, of Preston, in the county of Jackson and State of Iowa, have invented a new and Improved Check-Row Planter, of which the following is a full, clear, and exact description.

Our invention relates to machines for planting corn or other seeds in check-row to facilitate cultivation and harvesting of crops; and the invention has for its object to provide a simple, substantial, and effective machine of this character which will space off the dropping of the seed in a manner to assure planting in accurate check-row independently of the contour of the ground-surface and will make distinct marks in the earth, whereby to test the regularity of the planting as the work progresses.

The invention consists in certain novel features of construction and combination of parts of the check-row planter, all as hereinafter fully described and claimed.

Reference is to be had to the accompanying drawings, forming a part of this specification, in which similar letters of reference indicate corresponding parts in all the figures.

Figure 1:
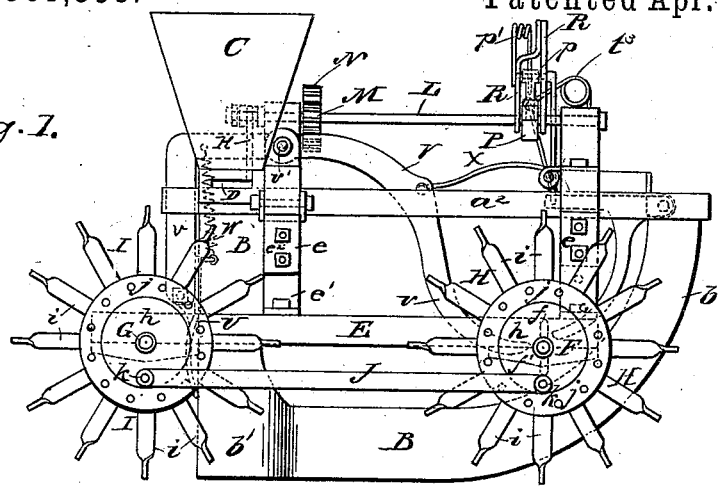
Figure 2:
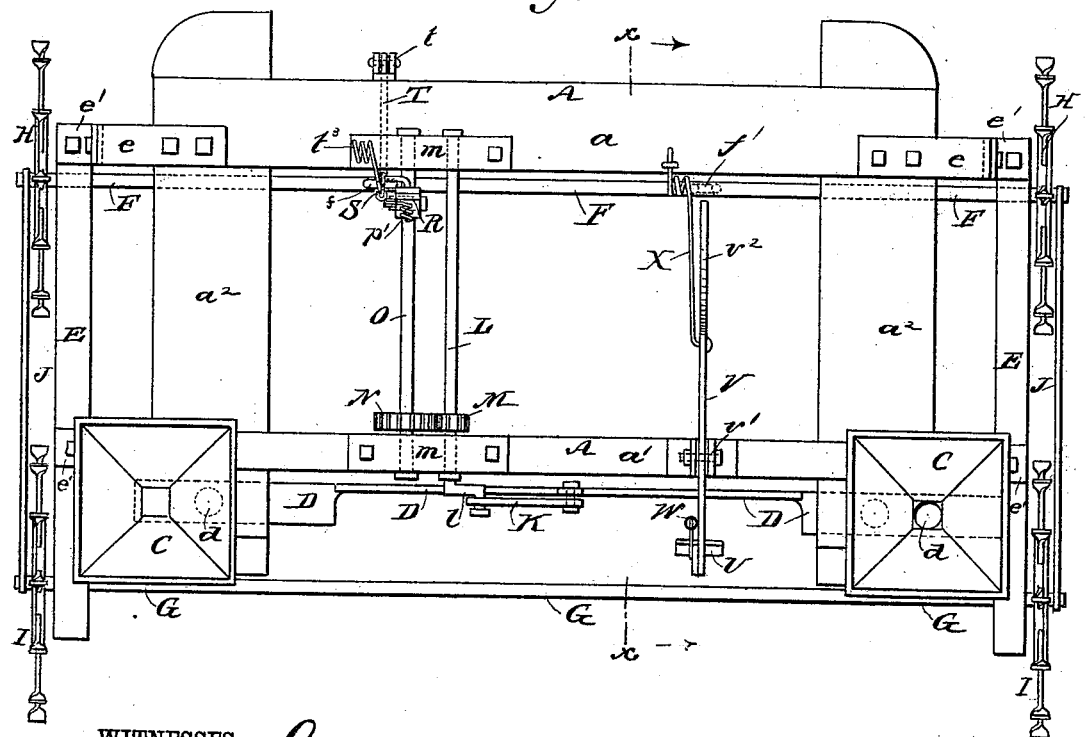

Figure 1 is a side elevation of our improved check-row planter. Fig. 2 is a plan view thereof. Fig. 3 is a rear view thereof, partly in section. Fig. 4 is a perspective view of parts of the seed-dropping-slide operating mechanism. Fig. 5 is an end elevation, partly in section, on the line $x\ x$, Fig. 2; and Fig. 6 is a cross-sectional elevation of one of the spacers or ground-measurers.

The frame A, which supports the shoes or runners B B of the planter, is made with a front cross-beam, $a$, a rear cross-beam, $a'$, and two opposite side beams, $a^2\ a^2$, suitably fastened together. The runners B are secured at their thin curved forward parts, $b$, to the front ends of the frame-beams $a^2$, and their box-like rear end parts, $b'$, which are fixed to the rear ends of the beams $a^2$, form chutes, through which seed dropped from the boxes C C may fall to the ground. The seed-boxes C, which may have any ordinary construction, are fixed to the back ends and tops of the frame-beams $a^2$, and the seed-dropping slide D, which controls the discharge of seed from both the boxes, is fitted in suitable slideways at the bottoms of the boxes, and has holes $d\ d$, which alternately register with the discharge ends of the boxes for dropping the seed therefrom, as hereinafter explained.

To the frame A are fixed pendent metal straps $e$, which overlap the upper parts of metal straps $e'$, fixed to the side bars, E E, of the spacing or measuring apparatus, and the straps $e\ e'$ are provided either with series of holes or slots, allowing the bars E to be adjusted higher or lower on the frame A, and held by bolts $e^2$ passed through the straps. In suitable bearings on the opposite side end bars, E E, there are journaled two shafts, F G, which range transversely of the machine and have fixed to their ends the spacers or measurers H I, the two spacers H H being on the shaft F and the two I I being on the shaft G, and the spacers H I, at each side of the machine, are connected by a rod, J, engaging crank-wrists $k$ on the spacers, and whereby all the spacers will be caused to rotate in unison. The spacers or measurers are made alike and comprise a hub, $h$, having face-notches to receive the inner ends of thin metal arms $i$, which are held to place by a face-ring, $j$, secured by bolts, the outer ends of the arms $i$ being preferably twisted, to present their broad sharpened extremities flatwise to the direction of motion of the machine and whereby the arms will enter and pass through the ground easily and will not slip therein; but the arms may have round or other shape in cross-section. The ends of the spacer-arms always stand about level with the lower edges of the shoes B.

To determine the distance apart of the hills, the spacer-arms $i$ may be radially adjusted to make the circumference of the spacer correspond to the required distance, and the bolts $e^2$ will be loosened to allow the straps $e'$, carrying the spacer-bars E, to be adjusted to bring the extremities of the arms $i$ about level with the bottoms of the shoes.

The seed-dropping slide D is connected by a rod or link, K, to a crank-arm, $l$, formed on or fixed to a shaft, L, journaled in bearings $m\ m$, fixed to the front and rear beams, $a\ a'$, of the frame A, and the shaft carries a pinion, M, which meshes with a gear-wheel, N, fast to a shaft, O, also journaled in the bearings m m, about parallel with the shaft L. On the shaft M is fixed a ratchet-wheel, P, with which a pawl, p, pivoted to a stirrup or yoke, R, journaled at its lower ends on the shaft L, is adapted to engage, and a spring, p', held to the yoke R, holds the pawl to the ratchet-wheel. A rod, S, connected to the pivot s of the pawl p, is connected at its other end with one arm, t, of an elbow-lever, T, which is pivoted at its angle at $t^2$ to the frame A, and extends by its other arm, t', into the path of a tappet, f, fixed to the spacer-shaft F, and whereby, as the shaft is rotated by the travel on or in the ground of its spacers H H, the yoke R will be swung downward on the shaft O, and will carry the pawl p around with it, and thereby cause the pawl to turn the shaft O and operate the gearing M N, to impart motion to the seed-dropping slide D, for carrying the seed from the boxes C C alternately, and dropping it through the boxes b' of the runners to the ground.

After each movement of the ratchet P and shaft O, as above described, a spring, $t^3$, connected at one end to the frame A, and connected with the arm t of lever T by a suitable link, $t^4$, acts instantly to carry the yoke R upward again on the shaft, and the pawl p will automatically engage the next tooth of the ratchet P, ready to again turn the shaft O, when the rotating tappet f again strikes the lever T. Each complete turn of the crank l by the shaft L causes a complete reciprocation or double stroke of the seed-slide D to drop one proper quantity of seed from each of the seed-boxes C C, and the gearing will be proportioned to time the movements of the slide for dropping the seed at proper distance apart for the hills as the machine is drawn over the field.

We use a marker, U, to mark the ground at places between the hills of seed to indicate to the operator whether or no the machine is planting in accurate check-row. This marker is a blade, preferably curved at its lower part, u, and pivoted at u' to the rear down-bent end v of a lever, V, which is fulcrumed at v' to the frame-beam a', and from its fulcrum ranges downward and forward at $v^2$ into the path of a tappet, f', fixed to the shaft F, and whereby, as the shaft F is rotated by its spacers H H, the tappet f' will throw the marker U downward into the ground. The marker is connected at its upper flanged end, $u^2$, by a spring, W, with the lever V, and, as the marker is lifted from the ground by the action of a spring, X, fixed to the lever and the frame A, after the tappet f' passes the lever, the marker will receive a throw forward by the action of said spring W, to cause the blade U to throw up sufficient earth to make a very distinct mark on the ground, which can be readily seen by the attendant as he glances across the field to see if the marks come into perfect alignment, as they should do when the planting is in accurate check-row.

We make special mention of the arrangement of the spacers with the extremities of their arms standing at a level with the bottom of the shoes B, which cut the furrow to receive the seed, as this causes the spacer-arms to enter the earth to the same depth as the shoes and to span or space off the ground at precisely the depth or level at which the seed is planted, irrespective of irregularities of the ground-surface; hence the planting is not affected by the contour of the ground. Consequently the planting must be in accurate check-row when the impressions made in the ground by the marker are in alignment, as will readily be understood.

The spacers H I at the side of the machine are set sufficiently apart to cross middle furrows or washouts without changing the distance between the hills of seed.

Having thus described our invention, what we claim as new, and desire to secure by Letters Patent, is—

1. A check-row planter comprising a frame, furrow-opening shoes or runners held thereto, and spacers journaled to the frame and provided with arms adapted to enter the ground and set with their extremities about level with the lower edges of the shoes, substantially as shown and described, whereby the ground will be spaced off at the level whereto the seed is dropped, irrespective of the contour of the ground-surface, as and for the purpose set forth.

2. The combination, in a check-row planter, of a frame, A, shoes or runners B B held thereto, side bars, E E, held to the frame A, shafts F G, journaled in said bars, spacers, as H I, on the shafts F G, respectively, and rods J, connecting the spacers H I at each side of the machine, substantially as described, for the purposes set forth.

3. The combination, in a check-row planter, of a frame, A, shoes B B, seed-boxes C C on the frame, a seed-dropping slide, D, fitted for dropping seed from both boxes, side bars, E E, held to the frame, a shaft, F, journaled in the said bars, spacers, as H, on the shaft E, shafts L O, journaled on the frame A and carrying gearing M N, a crank, l, on shaft L, a rod, K, connecting the crank with the seed-slide D, a yoke, R, journaled on the shaft O and carrying a spring-pressed pawl, p, a ratchet, P, fixed on shaft O and engaged by the pawl, a lever, T, fulcrumed to the frame A, a link, S, connecting said lever with the yoke R, a spring, as $t^3$, normally lifting the yoke, and a tappet, f, on the shaft F and into the path of which the arm t' of the lever T passes, substantially as shown and described, whereby the seed-dropping slide will be operated by the advance of the machine, as and for the purposes set forth.

4. The combination, in a check-row planter, of a frame, A, shoes B B held thereto, a shaft, as F, journaled in said bars and carrying spacers, as H, and a tappet, f', a lever, V, journaled to the frame A and extending into the path of the tappet, a marking-blade, as U, connected to the lever, and a retracting-spring, X, substantially as shown and described, whereby the marker will be actuated by the advance of the machine, as and for the purposes set forth.

5. The combination, with the frame A, a lever, V, fulcrumed thereto, and mechanism for operating the lever by the advance of the machine, of a marker, U, pivoted to the lever, and a spring, W, connecting the lever and marker, substantially as described, for the purpose set forth.

6. In a check-row planter, the combination of a frame, A, shoes B fixed thereto, side bars, E E, held to the frame A, to be vertically adjustable, shafts journaled on the bars E E, and spacers, as H I, on said shafts and made with arms $i$ radially adjustable to accommodate the vertical adjustment of the bars E E, substantially as shown and described, whereby a true level of the lower edges of the shoes and the extremities of the spacer-arms may be maintained at different adjustments of the machine, as and for the purposes herein set forth.

AUGUST F. TIEDE.
JAIRUS WILCOX.

Witnesses:
Z. DeGROAT,
E. A. BARTHOLOMEW.